Improvements in Feeders for Cornsheller & Separator combined.

Jacob Bernheisel, Senior
Inventor

72783

PATENTED
DEC 31 1867

United States Patent Office.

JACOB BERNHEISEL, SR., OF GREEN PARK, PENNSYLVANIA.

Letters Patent No. 72,783, dated December 31, 1867.

---

IMPROVEMENT IN COMBINED CORN-SHELLER AND SEPARATOR-FEEDER.

---

The Schedule referred to in these Letters Patent and making part of the same.

---

TO ALL WHOM IT MAY CONCERN:

Be it known that I, JACOB BERNHEISEL, Sr., of Green Park, Perry county, State of Pennsylvania, have invented new and useful Improvements in Feeders for Corn-Sheller and Separator combined; and I do hereby declare the following to be an exact description thereof, reference being had to the accompanying drawings, and to the letters of reference marked thereon, making a part of this specification, in which—

Figure 1:
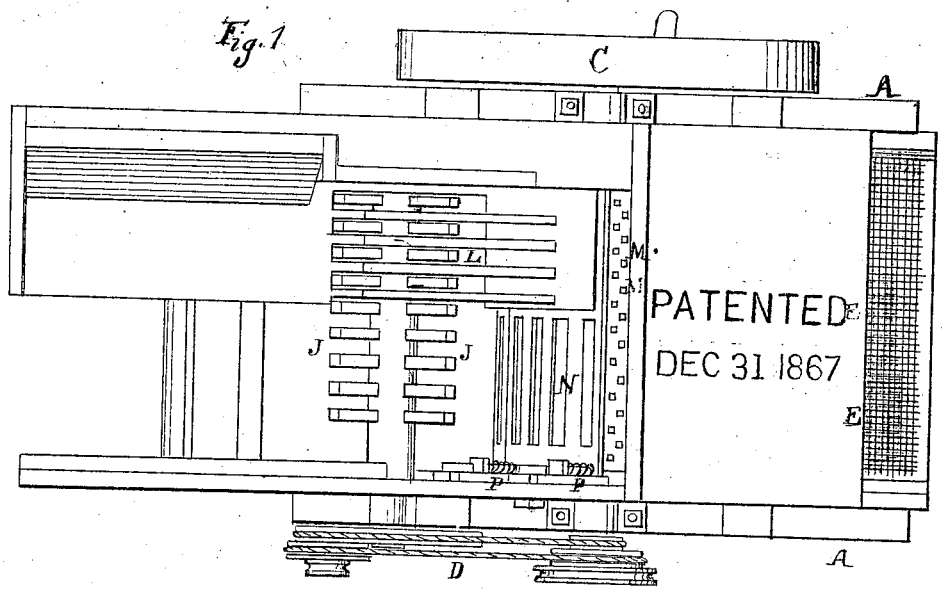

Figure 1 represents a top and sectional view.

Figure 2:
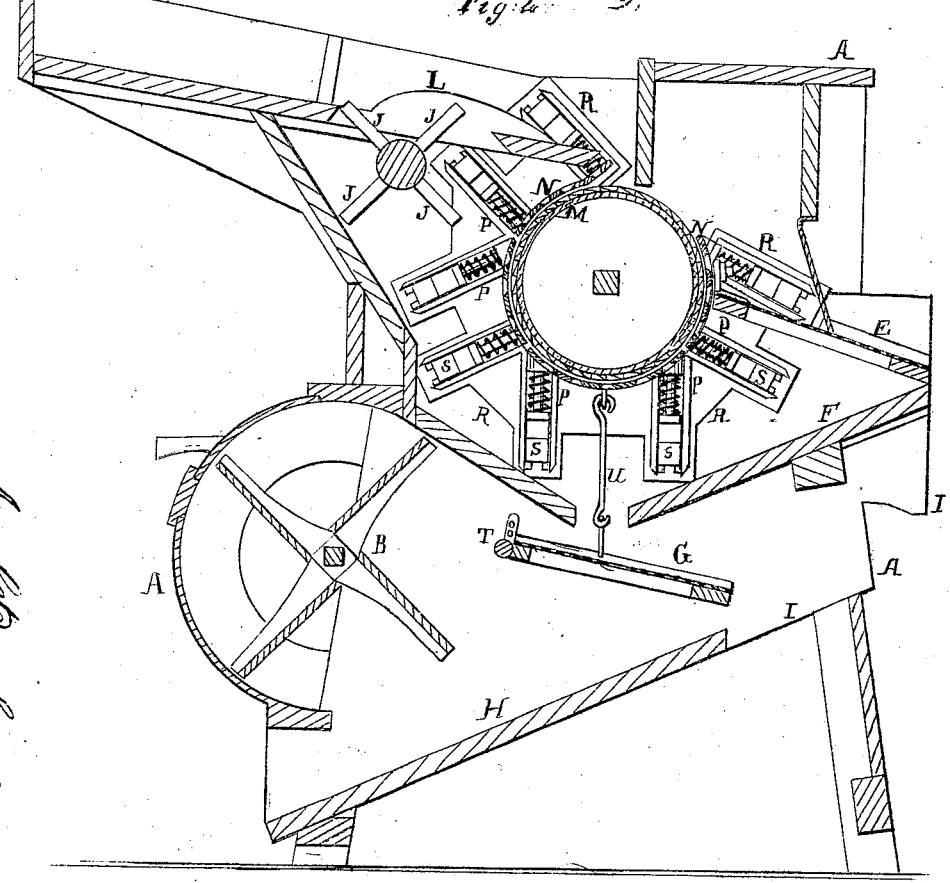

Figure 2 a sectional elevation.

The nature of my invention consists in the feeder and grate, the mode of regulating the grated iron concave, and the attachment of the upper and lower sieves to the concave, so as to vibrate with the motion of the concave.

A represents the upright frame, of ordinary construction, to contain the devices for shelling, screening, and winnowing the corn. B, the ordinary fan. C, the crank and band-wheel, so as to operate the machine by hand or horse-power. D, the common strap and pulley gearing. E, the upper sieve, through which the corn falls upon the incline apron or platform F to the lower sieve G, and through it on to the lower shoot H, where it falls perfectly cleaned. The cobs are thrown off over the sieve E, and the screenings or smut fall through and out at I. J J are a series of arms operating at the mouth of the incline hopper K, into which the ears of corn are thrown. The arms J or feeder catch the ears lengthwise, and carry them over the curved grate L to the shelling-cylinder M, each arm of the feeder J passing between each grate L, and preventing the ears from choking up or passing endwise upon the cylinder. The cylinder has oblique projecting pins on its periphery, to catch the ears and carry them around, pressing the ears against the slatted or grated concave N, and shelling the corn as the ears pass between the cylinder and concave N, and dropping the corn from between the grates of the concave N on to the apron F and sieve G. The grated concave N rests against spiral springs P P, on each side. These springs P P are attached to a circular iron plate, R, that is permanently fastened on each side, on the inside of the side boards of the frame A, and the springs P operate in guide-boxes S S of the iron plate R. These springs give a regular yielding spring motion to the concave N, that allows the concave to adjust and regulate itself according to the size of the ears of corn. The upper sieve E is permanently bolted to the rear end of the concave N, and the lower sieve G operates on a hinge, T, extending between the side boards of the frame A, and suspended by a linked rod, U, to the lower part of the concave N. The connections of the sieves E and G with the springing concave N, receive their motion from the concave, and give a continual vibration or motion to the sieves, whilst the fan B is continually cleaning and winnowing the corn.

What I claim as my invention, and desire to secure by Letters Patent, is—

1. The feeder J with the grate L, as combined, when constructed and operated as herein described, and for the purposes set forth.

2. I also claim the combination of the grated concave N, with its spiral springs P and sieves E and G, when constructed and operating as herein described, and for the purposes set forth.

3. I also claim the feeder J, grate L, concave N, springs P, and plate R, when arranged and combined with the cylinder M, sieves E and G, and fan B, as herein described, and for the purposes set forth.

JACOB BERNHEISEL, SR.

Witnesses:
J. FRANKLIN REIGART,
GEORGE HOOBAUGH.